A. D. GILLESPIE.
HAT PIN POINT PROTECTOR.
APPLICATION FILED MAR. 29, 1912.
1,031,437.
Patented July 2, 1912.
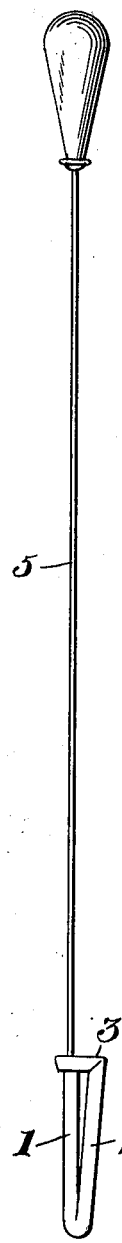
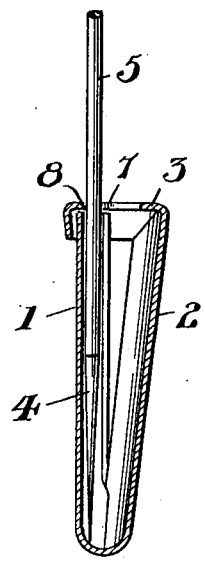
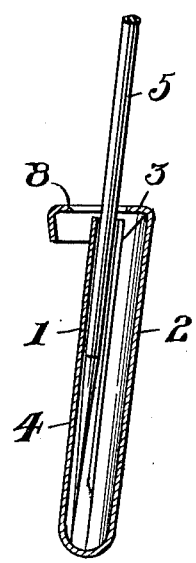
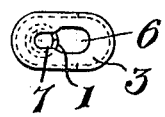
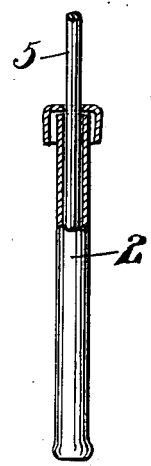
WITNESSES
INVENTOR
A. D. Gillespie
BY
ATTORNEYS

UNITED STATES PATENT OFFICE.

ALEXANDER D. GILLESPIE, OF HILLIARDS, PENNSYLVANIA.

HAT-PIN-POINT PROTECTOR.

1,031,437.  Specification of Letters Patent.  Patented July 2, 1912.

Application filed March 29, 1912. Serial No. 687,022.

*To all whom it may concern:*

Be it known that I, ALEXANDER D. GILLESPIE, a citizen of the United States of America, residing at Hilliards, in the county of Butler and State of Pennsylvania, have invented certain new and useful Improvements in Hat-Pin-Point Protectors, of which the following is a specification, reference being had therein to the accompanying drawing.

This invention relates to a hatpin point protector, and the objects of my invention are, first, to provide a simple and inexpensive device that can be easily and quickly mounted upon the pointed end of a pin to prevent pedestrians or the occupants of a crowded compartment from being injured by the pointed end of a pin; second, to provide a protecting device that serves as a lock for preventing accidental displacement of the pin relatively to a hat; third, to provide a device made of one piece of material that is susceptible to any desired ornamentation, and fourth, to accomplish the above results by a protecting device that is highly efficient in connection with a hatpin or a scarfpin.

I attain the above objects by a mechanical construction that will be hereinafter specifically described and then claimed, and reference will now be had to the drawing, wherein:—

Figure 1 is a side elevation of the device as applied to a hatpin, Fig. 2 is an enlarged longitudinal sectional view of the same in a locked position, Fig. 3 is a similar view of the device in an unlocked position, Fig. 4 is a front elevation of the device partly broken away and partly in section, and Fig. 5 is a plan of the device.

A device in accordance with this invention is made of a single piece of material and comprises a longitudinally split sleeve 1, an angularly disposed channel arm 2 and a locking head 3. The split sleeve 1 is adapted to receive the pointed end 4 of a hatpin 5 and said pin passes through a slot 6 in the head 3, which is positioned at an angle to the arm 2 to inclose the inner end of the sleeve 1. The slot 6 has one end thereof reduced, as at 7 and beveled, as at 8 to provide a tooth that will frictionally engage the pin 5. The sleeve 1 is movable relatively to the arm 2 and can be pressed toward said arm whereby the bore of the sleeve will aline with the slot 6 and permit of the pin being placed in said sleeve. When the sleeve 1 is released, the pin 5 is shifted into the reduced end of the slot 6 and is frictionally engaged by the beveled edge of said slot, thereby preventing the device from becoming accidentally displaced relatively to the pin. The head 3 limits the outward movement of the sleeve 1 with respect to the arm 2.

What I claim is:—

A hatpin point protector comprising an angularly disposed arm, a split sleeve formed integral with the outer end thereof and movable relatively to said arm, a head formed integral with the inner end of said arm and inclosing the inner end of said sleeve and adapted to limit the outward movement of the sleeve with respect to the arm, said head having a slot formed therein adapted to receive a pin mounted in said sleeve.

In testimony whereof I affix my signature in the presence of two witnesses.

ALEXANDER D. GILLESPIE.

Witnesses:
J. G. WAGNER,
B. C. QUIGLEY.

---

Copies of this patent may be obtained for five cents each, by addressing the "Commissioner of Patents. Washington, D. C."